(12) United States Patent
Riley et al.

(10) Patent No.: US 10,780,871 B2
(45) Date of Patent: Sep. 22, 2020

(54) APPARATUS AND METHOD FOR CONTROLLING PNEUMATIC FLUID TO A TRAILER

(71) Applicant: Bendix Commercial Vehicle Systems LLC, Elyria, OH (US)

(72) Inventors: Brian J Riley, New London, OH (US); Paul C Niglas, Avon, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 23 days.

(21) Appl. No.: 16/142,703

(22) Filed: Sep. 26, 2018

(65) Prior Publication Data

US 2020/0094805 A1 Mar. 26, 2020

(51) Int. Cl.
*B60T 13/68* (2006.01)
*B60T 8/17* (2006.01)
(Continued)

(52) U.S. Cl.
CPC .......... *B60T 13/683* (2013.01); *B60T 8/1708* (2013.01); *B60T 15/027* (2013.01); *B60T 13/268* (2013.01); *B60T 2270/403* (2013.01)

(58) Field of Classification Search
CPC .... B60T 13/683; B60T 8/1708; B60T 15/027; B60T 11/326; B60T 13/40; B60T 13/403;
(Continued)

(56) References Cited

U.S. PATENT DOCUMENTS 6,883,875 B2 * 4/2005 Tate .......................... B60T 8/36
                                                                 303/113.2
8,260,520 B2 * 9/2012 Eberling ................... B60T 7/20
                                                                  701/81

(Continued)

FOREIGN PATENT DOCUMENTS

DE     102006041011 A1    3/2008
DE     102015114176 B3    7/2016
(Continued)

OTHER PUBLICATIONS

International Search Report for counterpart International Appln. No. PCT/US2019/051656, dated Dec. 3, 2019, 5 pages.
(Continued)

*Primary Examiner* — Pamela Rodriguez
(74) *Attorney, Agent, or Firm* — Brian Kondas; Cheryl Greenly; Eugene Clair

(57) ABSTRACT

A trailer control valve comprises a valve electronic control port adapted to receive an electronic control signal; a valve pneumatic supply port unrestrictedly fluidly communicating with a first supply of a pneumatic fluid; a valve pneumatic control port normally proportionally fluidly communicating with a second supply of the pneumatic fluid based on a pressure representing a driver brake demand, the first supply of the pneumatic fluid being in an independent pneumatic circuit from the second supply of the pneumatic fluid; and a valve delivery port selectively fluidly communicating with at least one of the valve pneumatic supply port and the valve pneumatic control port based on the electronic control
(Continued)

signal, the pressure representing the driver brake demand and a pressure of the first supply of the pneumatic fluid. A first pneumatic check valve includes a first check valve supply port fluidly communicating with the first supply of the pneumatic fluid; and a first check valve delivery port fluidly communicating with the relay valve pneumatic supply port. The first pneumatic check valve controls the fluid communication of the first supply of the pneumatic fluid with the relay valve pneumatic supply port based on the pressure of the first supply of the pneumatic fluid at the valve pneumatic supply port.

8 Claims, 4 Drawing Sheets

(51) Int. Cl.
*B60T 15/02* (2006.01)
*B60T 13/26* (2006.01)

(58) Field of Classification Search
CPC .. B60T 13/26; B60T 13/263; B60T 2270/403; B60T 13/268
USPC .... 303/20, 3, 7, 122.09, 122.1, 122.15, 123; 701/71, 75, 76, 78, 82, 83
See application file for complete search history.

(56) References Cited

U.S. PATENT DOCUMENTS

| | | | | |
|---|---|---|---|---|
| 9,758,140 | B2* | 9/2017 | Eberling | B60T 7/20 |
| 10,150,457 | B2* | 12/2018 | Howell | B60T 7/122 |
| 2010/0078988 | A1 | 4/2010 | Bensch et al. | |
| 2010/0106388 | A1 | 4/2010 | Eberling | |
| 2018/0273013 | A1* | 9/2018 | Niglas | B60T 7/20 |

FOREIGN PATENT DOCUMENTS

| | | |
|---|---|---|
| EP | 2055542 A1 | 5/2009 |
| EP | 2199162 A1 | 6/2010 |

OTHER PUBLICATIONS

Written Opinion for counterpart International Appln. No. PCT/US2019/051656, dated Dec. 3, 2019, 6 pages.

Information on Search Strategy for counterpart International Appln. No. PCT/US2019/051656, dated Dec. 3, 2019, 1 page.

* cited by examiner

APPARATUS AND METHOD FOR CONTROLLING PNEUMATIC FLUID TO A TRAILER

BACKGROUND

The present invention relates to a trailer control valve function. It finds particular application in conjunction with delivering pneumatic fluid, the event of a pneumatic or electronic failure, from a tractor to a trailer based on a trailer service brake demand and will be described with particular reference thereto. It will be appreciated, however, that the invention is also amenable to other applications.

Current control strategies for electronically applying trailer brakes involve using a relay valve to apply full system air pressure to a supply port of an antilock braking system (ABS) modulator. The ABS modulator is set to hold off pressure and pulses to send a set volume of air into the trailer control line to apply trailer brakes. There is no mechanism to compensate for any loss of air volume in the trailer due to a pneumatic or electronic failure and/or to verify that the required air pressure has been delivered to the trailer.

The present invention provides a new and improved apparatus and method for compensating for loss of air volume in the trailer due to a pneumatic or electronic failure.

SUMMARY

In one aspect of the present invention, it is contemplated that a trailer control valve comprises a valve electronic control port adapted to receive an electronic control signal; a valve pneumatic supply port unrestrictedly fluidly communicating with a first supply of a pneumatic fluid; a valve pneumatic control port normally proportionally fluidly communicating with a second supply of the pneumatic fluid based on a pressure representing a driver brake demand, the first supply of the pneumatic fluid being in an independent pneumatic circuit from the second supply of the pneumatic fluid; and a valve delivery port selectively fluidly communicating with at least one of the valve pneumatic supply port and the valve pneumatic control port based on the electronic control signal, the pressure representing the driver brake demand and a pressure of the first supply of the pneumatic fluid. A first pneumatic check valve includes a first check valve supply port fluidly communicating with the first supply of the pneumatic fluid; and a first check valve delivery port fluidly communicating with the relay valve pneumatic supply port. The first pneumatic check valve controls the fluid communication of the first supply of the pneumatic fluid with the relay valve pneumatic supply port based on the pressure of the first supply of the pneumatic fluid at the valve pneumatic supply port.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
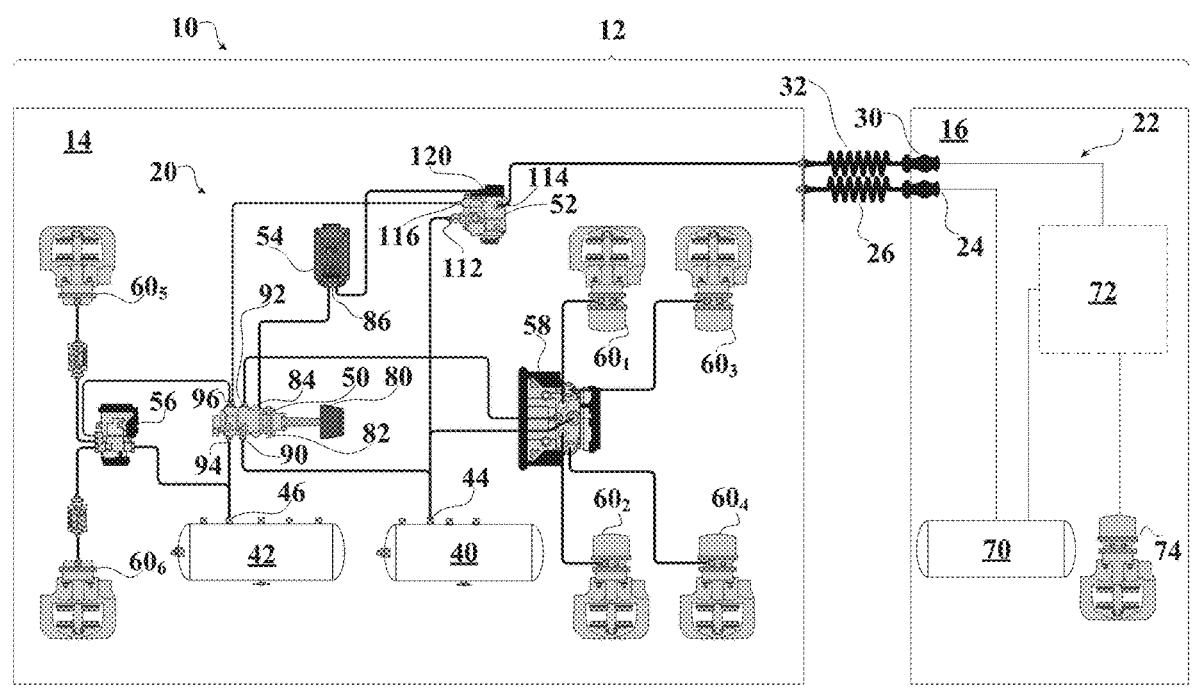
FIG. 1 illustrates a simplified schematic representation of an exemplary braking system for a vehicle in accordance with one embodiment of an apparatus illustrating principles of the present invention.

With reference to FIG. 1, a simplified component diagram of an exemplary braking system 10 for a vehicle 12 is illustrated in accordance with one embodiment of the present invention. In the illustrated embodiment, the vehicle 12 is an articulated vehicle including a first portion 14 (e.g., tractor portion) and a second portion 16 (e.g., a trailer portion). The system 10 includes a tractor braking system 20 on the tractor portion 14 of the vehicle 12 and a trailer braking system 22 on the trailer portion 16 of the vehicle 12. A supply glad-hand 24 fluidly communicates a fluid (e.g., a pneumatic fluid) between the tractor braking system 20 and a supply line 26 of the trailer braking system 22. A control glad-hand 30 fluidly communicates the fluid between the tractor braking system 20 and a control line 32 of the trailer braking system 22.

The tractor braking system 20 includes a first supply 40 (e.g., first reservoir) of the pneumatic fluid and a second supply 42 (e.g., second reservoir) of the pneumatic fluid. The first reservoir 40 includes a delivery port 44, and the second reservoir 42 includes a delivery port 46. The first reservoir 40 is in an independent pneumatic circuit from the second reservoir 42. Therefore, the pneumatic fluid in the circuit including the first reservoir 40 does not mix with the pneumatic fluid in the circuit including the second reservoir 42. Although it is not illustrated, it is to be understood the supply line 26 fluidly communicates with both the first reservoir 40 and the second reservoir 42 through at least one (1) valve.

The tractor braking system 20 also includes a foot brake valve (FBV) 50, a trailer control valve (TCV) 52, an electronic control unit (ECU) 54, a first electro-pneumatic module (EPM) 56, a second EPM 58, and a plurality (e.g., six (6)) service brakes $60_{1,2,3,4,5,6}$ (collectively, 60). The trailer braking system 22 includes: a trailer reservoir 70 fluidly communicating with the supply glad-hand 24; and a trailer relay valve 72 fluidly communicating with the control glad-hand 30 and a trailer service brake 74. The trailer service brake 74 is applied using pneumatic fluid in the trailer reservoir 70 based on a pressure of the pneumatic fluid supplied to the trailer relay valve from the control glad-hand 30.

The FBV 50 includes a pedal 80, which is activated by a driver of the vehicle 12 to activate the brakes 60. A sensor 82 in the FBV 50 senses how far (e.g., the distance) the pedal 80 is depressed by the driver of the vehicle 12 to activate the service brakes 60 (e.g., pedal 80 travel). The sensor 82 electrically communicates with an electronic port 84 of the FBV 50 and transmits a distance electronic signal (e.g., a pedal 80 travel signal), which is indicative of the distance the pedal 80 is depressed, to an electronic port 86 of the ECU 54. Upon receiving the electronic signal from the sensor 82, the ECU 54 determines a driver braking demand (e.g., how intensely the driver desires the brakes 60 should be applied) based on the electronic signal from the sensor 82 indicating the distance the pedal 80 is depressed. For example, the ECU 54 determines the driver braking demand based on a linear relationship between the distance the pedal 80 is depressed and the driver braking demand.

The FBV 50 also includes a primary circuit, which includes a primary supply port 90 and a primary delivery port 92, and a secondary circuit, which includes a secondary supply port 94 and a secondary delivery port 96. The primary supply port 90 fluidly communicates with the delivery port 44 of the first reservoir 40, and the secondary supply port 94 fluidly communicates with the delivery port 46 of the second reservoir 42. As is commonly understood, the primary supply port 90 fluidly communicates with the primary delivery port 92 based on the distance the pedal 80 is depressed (e.g., a linear relationship); similarly, the secondary supply port 96 fluidly communicates with the secondary delivery port 96 based on the distance the pedal 80 is depressed (e.g., a linear relationship).

The brakes 60$_{1,2,3,4}$ are applied based on a pressure of the pneumatic fluid at the primary delivery port 92; and the brakes 60$_{5,6}$ are applied based on a pressure of the pneumatic fluid at the secondary delivery port 96.

The TCV 52 includes a pneumatic supply port 112, a pneumatic delivery port 114, a pneumatic control port 116 and an electronic control port 120. The TCV pneumatic supply port 112 fluidly communicates with the delivery port 44 of the first reservoir 40. The TCV pneumatic delivery port 114 fluidly communicates with the control glad-hand 30.

During normal operation: i) the TCV pneumatic supply port 112 unrestrictedly fluidly communicates with the delivery port 44 of the first reservoir 40; ii) the pneumatic control port 116 of the TCV 52 fluidly communicates with the second reservoir 42 via the secondary circuit of the FBV 50 (e.g., via the secondary supply port 94 and the secondary delivery port 96); iii) the FBV sensor 82 is functioning properly and is capable of transmitting the distance electronic signal to the ECU 54; iv) the ECU 54 is functioning properly and is capable of receiving the distance electronic signal from the FBV electronic port 84 via the ECU port 86 and capable of transmitting an electronic control signal indicative of the driver braking demand to the TCV 52; and v) the TCV 52 is functioning properly and is capable of receiving the electronic signal indicative of the driver braking demand from the ECU 54 via the TCV electronic control port 120.

Because the pneumatic control port 116 of the TCV 52 fluidly communicates with the second reservoir 42 via the secondary supply port 94 and the secondary delivery port 96, the fluid communication between the pneumatic control port 116 and the second reservoir 42 is based on (e.g., proportional to) the amount of fluid communication between the secondary supply port 94 and the secondary delivery port 96. For example, the fluid communication between the secondary supply port 94 and the secondary delivery port 96 (e.g., the pressure representing the driver brake demand) is zero (0) pounds per square inch (psi) if the pedal 80 is not depressed, and increases based on (e.g., proportionally) as the distance the pedal 80 is depressed. Therefore, the pneumatic control port 116 fluidly communicates with the second reservoir 42 based on the driver brake demand.

Figure 2:
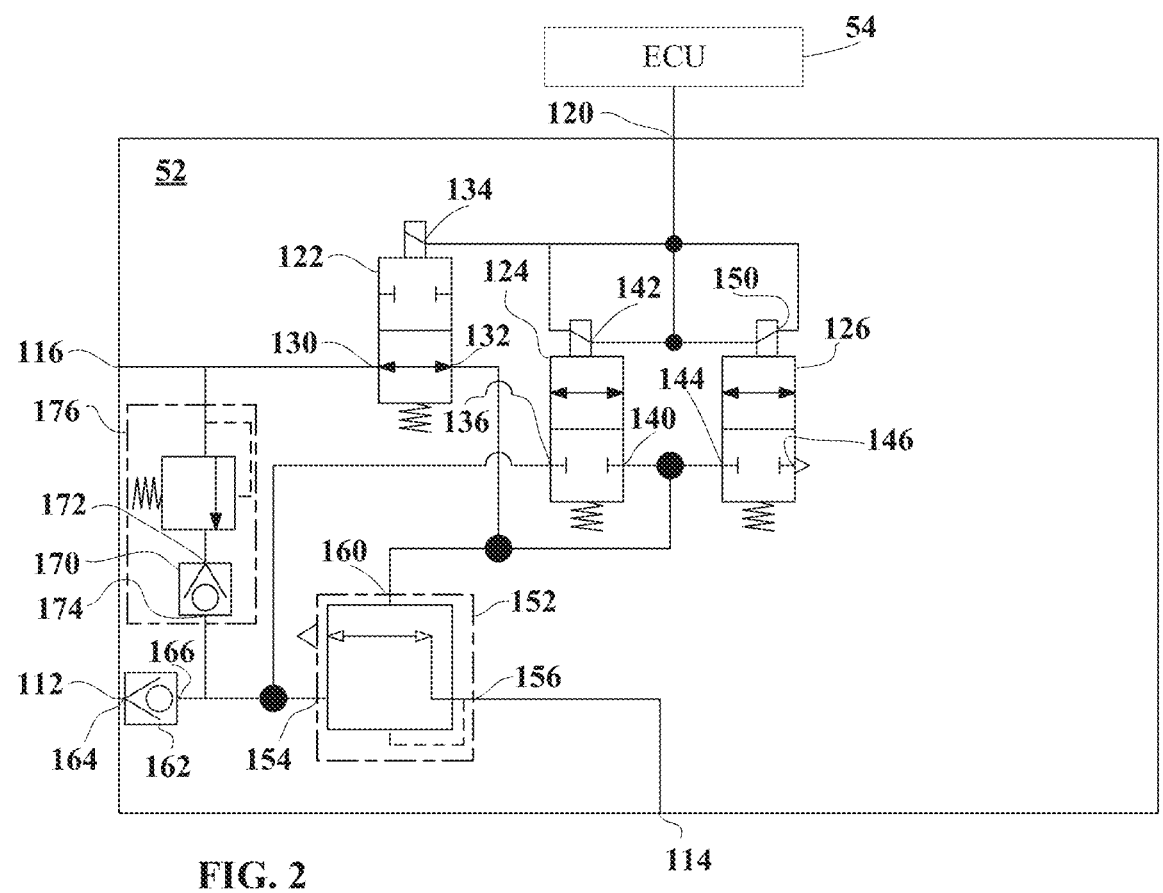
FIG. 2 illustrates one embodiment of a simplified component diagram of an exemplary trailer control valve in accordance with one embodiment of an apparatus illustrating principles of the present invention.

With reference to FIGS. 1 and 2, the TCV 52 includes a first switching valve 122, a second switching valve 124 and a third switching valve 126. In one embodiment, the first, second and third switching valves 122, 124, 126, respectively, are solenoid valves. Each of the three (3) switching valves 122, 124, 126 is illustrated (see FIG. 2) in its respective deenergized state.

The first solenoid 122 includes a pneumatic supply port 130, a pneumatic delivery port 132 and an electronic control port 134. In the illustrated embodiment, the first solenoid supply port 130 fluidly communicates with the first solenoid delivery port 132 when the first solenoid 122 is in an deenergized state (see FIG. 2) by not receiving an electronic control signal from the ECU 54. Conversely, the first solenoid supply port 130 does not fluidly communicate with the first solenoid delivery port 132 when the first solenoid 122 is in an energized state by receiving an electronic control signal from the ECU 54. Therefore, in the deenergized state, pressure of the pneumatic fluid at the first solenoid supply port 130 fluidly communicates with the first solenoid delivery port 132; and, in the energized state, pressure of the pneumatic fluid at the first solenoid supply port 130 does not fluidly communicate with the first solenoid delivery port 132.

The second solenoid 124 includes a pneumatic supply port 136, a pneumatic delivery port 140 and an electronic control port 142. In the illustrated embodiment, the second solenoid supply port 136 does not fluidly communicate with the second solenoid delivery port 140 when the second solenoid 124 is in an deenergized state (see FIG. 2) by not receiving an electronic control signal from the ECU 54. Conversely, the second solenoid supply port 136 does fluidly communicate with the second solenoid delivery port 140 when the second solenoid 124 is in an energized state by receiving an electronic control signal from the ECU 54. Therefore, in the deenergized state, pressure of the pneumatic fluid at the second solenoid supply port 136 does not fluidly communicate with the second solenoid delivery port 140; and, in the energized state, pressure of the pneumatic fluid at the second solenoid supply port 136 does fluidly communicate with the second solenoid delivery port 140.

The third solenoid 126 includes a pneumatic supply port 144, a pneumatic delivery port 146 and an electronic control port 150. In the illustrated embodiment, the third solenoid supply port 144 does not fluidly communicate with the third solenoid delivery port 146 when the third solenoid 126 is in an deenergized state (see FIG. 2) by not receiving an electronic control signal from the ECU 54. Conversely, the third solenoid supply port 144 does fluidly communicate with the third solenoid delivery port 146 when the third solenoid 126 is in an energized state by receiving an electronic control signal from the ECU 54. Therefore, in the deenergized state, pressure of the pneumatic fluid at the third solenoid supply port 144 does not fluidly communicate with the third solenoid delivery port 146; and, in the energized state, pressure of the pneumatic fluid at the third solenoid supply port 144 does fluidly communicate with the third solenoid delivery port 146.

The three (3) solenoid valves 122, 124, 126 are considered to be energized when respective electronic signals are transmitted from the ECU 54 to the respective solenoid valve electronic control port 134, 142, 150. On the other hand, the three (3) solenoid valves 122, 124, 126 are considered to be deenergized when respective electronic signals are not transmitted from the ECU 54 to the respective solenoid valve electronic control port 134, 142, 150.

A relay valve 152 includes a pneumatic supply port 154, a pneumatic delivery port 156 and a pneumatic control port 160.

For purposes of discussion, both the presence and absence of an electronic signal are considered electronic control signals. For example, a signal to energize a solenoid (e.g., 122, 124, 126) is a control signal. Similarly, the absence of a signal at a solenoid (e.g., 122, 124, 126) is also a control signal.

The first solenoid supply port 130 fluidly communicates with the TCV pneumatic control port 116. The first solenoid delivery port 132 fluidly communicates with the second solenoid delivery port 140, the third solenoid supply port 144 and the relay valve control port 160. The second solenoid supply port 136 fluidly communicates with the relay valve supply port 154. The second solenoid delivery port 140 fluidly communicates with the third solenoid supply port 144 and the relay valve control port 160. The third solenoid delivery port 146 is an exhaust port and fluidly communicates with atmosphere.

The relay valve delivery port 156 fluidly communicates with the control glad-hand 30 via the TCV pneumatic delivery port 114.

A first pneumatic check valve 162 includes a supply port 164 and a delivery port 166. The first check valve supply port 164 fluidly communicates with the pneumatic fluid in the first reservoir 40. The first check valve delivery port 166 fluidly communicates with the relay valve supply port 154. The first check valve supply port 164 fluidly communicates with the first check valve delivery port 166 based on the relative pressures of the pneumatic fluid at the first check valve supply port 164 and the first check valve delivery port 166. For example, the first check valve supply port 164 fluidly communicates with the first check valve delivery port 166 only if the pressure at the first check valve delivery port 166 is less than the pressure at the first check valve supply port 164.

The TCV 52 also includes a second pneumatic check valve 170 having a supply port 172 and a delivery port 174. The second check valve delivery port 174 fluidly communicates with the first check valve delivery port 166. Optionally, a pressure protection valve (PPV) 176 is pneumatically positioned between the TCV pneumatic control port 116 and the second pneumatic check valve 170. The PPV 176 closes to prevent fluid communication between the TCV pneumatic control port 116 and the second pneumatic check valve 170 when pressure at the second check valve supply port 172 is less than a predetermined pressure (e.g., about 45 psi). Otherwise, the PPV 176 is open to permit fluid communication between the TCV pneumatic control port 116 and the second check valve supply port 172.

Figure 3:
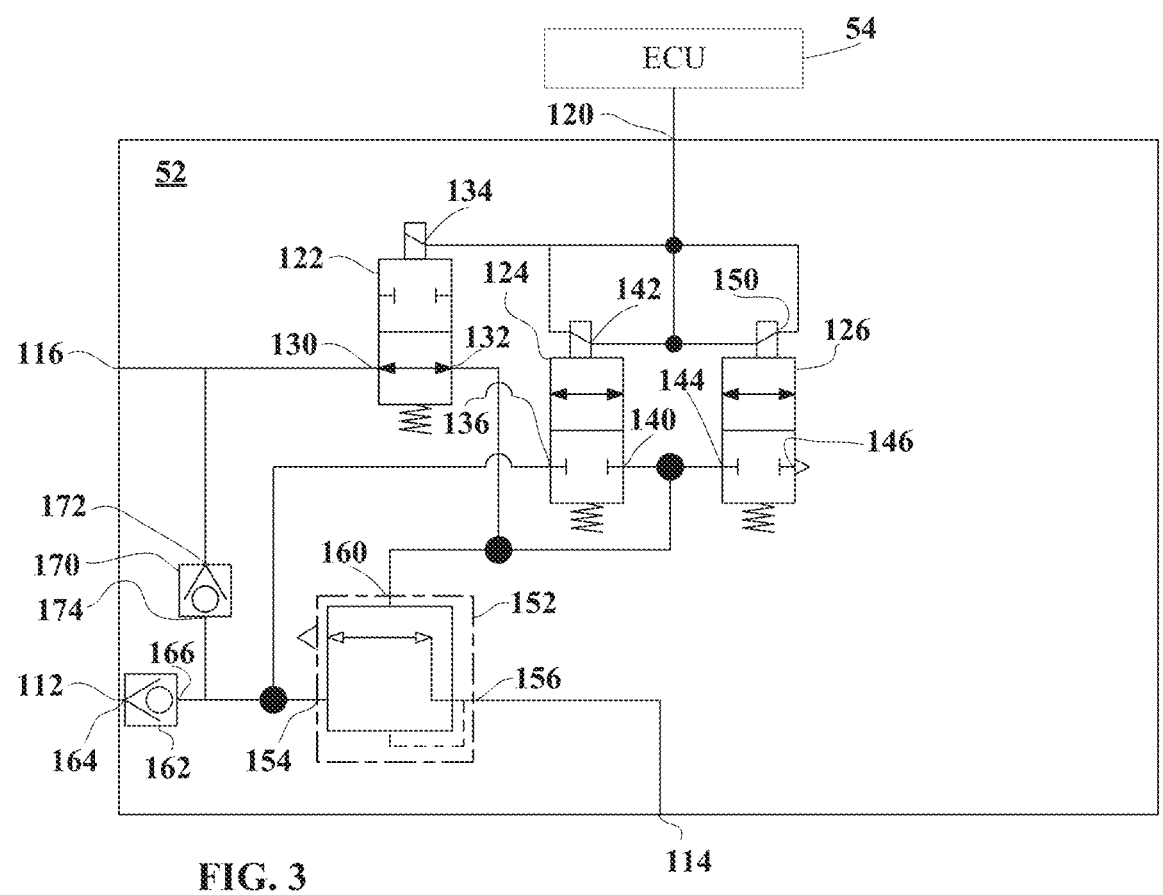
FIG. 3 illustrates another embodiment of a simplified component diagram of an exemplary trailer control valve in accordance with one embodiment of an apparatus illustrating principles of the present invention.

FIG. 3 illustrates an alternate embodiment without the optional PPV 176 of FIG. 2.

With reference to FIGS. 1-3 and as described in more detail below, the TCV delivery port 114 selectively fluidly communicates with at least one of the TCV supply port 112 and the TCV pneumatic control port 116 based on the electronic control signals controlling the solenoids 122, 124, 126, the pressure representing the driver brake demand at the TCV control port 116 and a pressure of the first supply of the pneumatic fluid at the TCV supply port 112.

Figure 4:
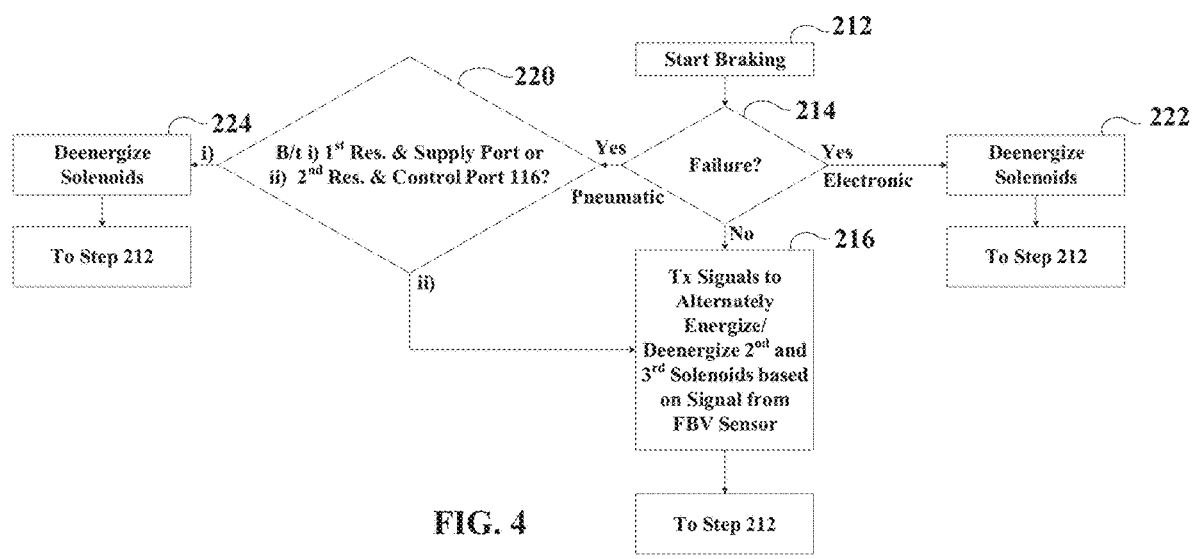
FIG. 4 is an exemplary methodology of controlling the braking system of the vehicle in accordance with one embodiment illustrating principles of the present invention.

With reference to FIG. 4, an exemplary methodology of the system shown in FIGS. 1-3 for braking the vehicle 12 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-4, a service brake 60 demand is initiated, in a step 212, by depressing the pedal 80. In a step 214, a determination is made whether a failure is present in the brake system 10. If it is determined in the step 214 that no failure is present in the brake system 10, control passes to a step 216 for normal braking. If it is determined in the step 214 that a pneumatic failure is present in the brake system 10, control passes to a step 220 for initiating a backup braking process to overcome the pneumatic failure. If it is determined in the step 214 that an electronic failure is present in the brake system 10, control passes to a step 222 for initiating a pneumatic backup braking process to overcome the electronic failure.

During normal braking, the ECU 54 transmits signals, in the step 216, to alternately energize and deenergize the second solenoid 124 and alternately energize and deenergize the third solenoid 126, based on the pedal travel signal, to build and exhaust pressure of the pneumatic fluid at the relay valve control port 160 based on the pedal travel signal. During normal braking, the ECU 54 also transmits signals, in the step 216, to alternately energize and deenergize the second solenoid 124 and alternately energize and deenergize the third solenoid 126, based on a weight of the trailer 16 (e.g., increase/decrease brake application if the trailer 16 is heavier/lighter, respectively), to balance wear of respective brake pads on the service brakes 60 and/or decrease application time of the service brakes 60. Control then returns to the step 212 after the braking event (e.g., after the pedal 80 is released).

If it is determined in the step 214 that an electronic failure is present in the brake system 10, the pneumatic backup braking process is initiated by passing to the step 222, during which each of the solenoids 122, 124, 126 is deenergized. When the solenoids 122, 124, 126 are deenergized, pneumatic fluid at system pressure (e.g., ~120 psi) is fluidly communicated from the first reservoir 40 to the relay valve supply port 154 via the first check valve 162. The second check valve 170 prevents the pneumatic fluid at the TCV supply port 112 being communicated to the TCV pneumatic control port 116 and the first solenoid supply port 130. A driver of the vehicle 12 demands service brake application by depressing the pedal 80. Pressure of the pneumatic fluid begins to pass from the second reservoir 42 to the pneumatic control port 116 via the secondary circuit of the FBV 50 based on how far the pedal 80 is depressed. The pressure of the pneumatic fluid at the TCV pneumatic control port 116 passes to the relay valve control port 160 via the first solenoid 122. In one embodiment, the relay valve 152 acts to pass the pressurized pneumatic fluid at the relay valve supply port 154 to the relay valve delivery port 156 until the pressure of the pneumatic fluid at the relay valve delivery port 156 substantially equals the pressure of the pneumatic fluid at the relay valve control port 160. The pressurized pneumatic fluid at the relay valve delivery port 156 is fluidly communicated to the control glad-hand 30 via the TCV delivery port 114. Control then returns to the step 212 after the braking event (e.g., after the pedal 80 is released).

If it is determined in the step 214 that a pneumatic failure is present in the brake system 10, a determination is made, in the step 220 (e.g., a pneumatic failure), whether the pneumatic failure is: i) between the first reservoir 40 and the TCV supply port 112, in which case control passes to a step 224; or ii) between the second reservoir 42 and the TCV pneumatic control port 116, in which case control passes to the step 216.

If it is determined in the step 220 that a pneumatic failure exists between the first reservoir 40 and the TCV supply port 112, the pressure of the pneumatic fluid at both the TCV supply port 112 and at the second solenoid supply port 136 is unreliable. Therefore, in the step 224, each of the solenoids 122, 124, 126 is deenergized. Consequently, as discussed above, the pressure of the pneumatic fluid representing the demanded service brake application at the TCV pneumatic control port 116 is fluidly transmitted to the relay valve control port 160 (via the first solenoid 122) and to the relay valve supply port 154 (via the optional PPV 176 and the second check valve 170). The respective pressures of the pneumatic fluid at the relay valve control port 160 and the relay valve supply port 154 are sufficient to transmit enough pressure of the pneumatic fluid to the control glad-hand 30 for activating trailer service brakes 74 on the trailer portion 16 of the vehicle 12. Control then returns to the step 212 after the braking event (e.g., after the pedal 80 is released).

If it is determined in the step 220 that a pneumatic failure exists between the second reservoir 42 and the TCV pneumatic control port 116, the pressure of the pneumatic fluid at the TCV pneumatic control port 116 is not reliable (e.g., not based on or representative of the driver demanded service brake application indicated by the distance the pedal 80 is depressed). Therefore, control passes to the step 216, which is discussed above.

The TCV 52 and method discussed above provide for i) compensating for any loss of air volume in the trailer and/or verifying that the required air pressure has been delivered to the trailer 16; and ii) compensating for a failure in one of the air supply circuits (e.g., from the first reservoir 40 or from the second reservoir 42).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A trailer control valve, including:
  a valve electronic control port adapted to receive an electronic control signal;
  a valve pneumatic supply port unrestrictedly fluidly communicating with a first supply of a pneumatic fluid;
  a valve pneumatic control port normally proportionally fluidly communicating with a second supply of the pneumatic fluid based on a pressure representing a driver brake demand, the first supply of the pneumatic fluid being in an independent pneumatic circuit from the second supply of the pneumatic fluid;
  a valve delivery port selectively fluidly communicating with at least one of the valve pneumatic supply port and the valve pneumatic control port based on the electronic control signal, the pressure representing the driver brake demand and a pressure of the first supply of the pneumatic fluid;
  a first pneumatic check valve, including:
    a first check valve supply port fluidly communicating with the first supply of the pneumatic fluid; and
    a first check valve delivery port;
  a first solenoid valve, including:
    a first solenoid electronic control port electrically communicating with the valve electronic control port;
    a first solenoid pneumatic supply port fluidly communicating with the valve pneumatic control port; and
    a first solenoid pneumatic delivery port; and
  a relay valve, including:
    a relay valve pneumatic supply port fluidly communicating with the first supply of the pneumatic fluid based on a pressure of the first supply of the pneumatic fluid at the valve pneumatic supply port, the first check valve delivery port fluidly communicating with the relay valve pneumatic supply port, the first pneumatic check valve controlling the fluid communication of the first supply of the pneumatic fluid with the relay valve pneumatic supply port based on the pressure of the first supply of the pneumatic fluid at the valve pneumatic supply port;
    a relay valve pneumatic delivery port fluidly communicating with the valve delivery port; and
    a relay valve pneumatic control port fluidly communicating with the first solenoid pneumatic delivery port, a pressure of the pneumatic fluid at the relay valve delivery port based on a pressure of the pneumatic fluid at the relay valve control port; and
  a second solenoid valve, including:
    a second solenoid electronic control port electrically communicating with the valve electronic control port;
    a second solenoid pneumatic supply port fluidly communicating with the relay valve pneumatic supply port; and
    a second solenoid pneumatic delivery port fluidly communicating with the relay valve pneumatic control port;
  wherein during a first failure:
    the electronic control signal received at the electronic control port causes the second solenoid pneumatic supply port to alternately fluidly communicate with the second solenoid pneumatic delivery port; and
    the pneumatic fluid from the first supply is fluidly transmitted to the relay valve pneumatic control port via the second solenoid valve pneumatic supply port and the second solenoid valve pneumatic delivery port during alternate fluid communications between the second solenoid valve pneumatic supply port and the second solenoid valve pneumatic delivery port;
  wherein during the first failure, the electronic control signal received at the electronic control port causes the first solenoid pneumatic delivery port to not fluidly communicate with the first solenoid pneumatic supply port.

2. The trailer control valve as set forth in claim 1:
  further including a third solenoid valve, including:
    a third solenoid electronic control port electrically communicating with the valve electronic control port;
    a third solenoid pneumatic supply port fluidly communicating with both the second solenoid pneumatic delivery port and the relay valve pneumatic control port; and
    a third solenoid pneumatic delivery port fluidly communicating with atmosphere pressure;
  wherein during the first failure:
    the electronic control signal received at the electronic control port causes the third solenoid pneumatic supply port to alternately fluidly communicate with the third solenoid pneumatic delivery port; and the alternate fluid communication between the second solenoid valve pneumatic supply port and the second solenoid valve pneumatic delivery port in conjunction with the alternate fluid communication between the third solenoid pneumatic supply port to alternately fluidly communicate with the third solenoid pneumatic delivery port cooperates to achieve the driver brake demand.

3. The trailer control valve as set forth in claim 1, wherein:
the valve pneumatic supply port unrestrictedly fluidly communicates with the first supply of the pneumatic fluid independent of the driver brake demand.

4. The trailer control valve as set forth in claim 1, wherein during a second failure:
the electronic control signal received at the electronic control port causes the first solenoid pneumatic delivery port to fluidly communicate with the first solenoid pneumatic supply port;
the pneumatic fluid at the valve pneumatic control port fluidly communicates with the relay valve pneumatic control port via the second solenoid pneumatic supply port and the second solenoid pneumatic delivery port; and
the pneumatic fluid at the valve pneumatic control port fluidly communicates with the relay valve pneumatic control port via a check valve.

5. A trailer control valve, including:
a valve electronic control port adapted to receive an electronic control signal;
a valve pneumatic supply port unrestrictedly fluidly communicating with a first supply of a pneumatic fluid;
a valve pneumatic control port normally proportionally fluidly communicating with a second supply of the pneumatic fluid based on a pressure representing a driver brake demand, the first supply of the pneumatic fluid being in an independent pneumatic circuit from the second supply of the pneumatic fluid;
a valve delivery port selectively fluidly communicating with at least one of the valve pneumatic supply port and the valve pneumatic control port based on the electronic control signal, the pressure representing the driver brake demand and a pressure of the first supply of the pneumatic fluid; and
a first pneumatic check valve, including:
a first check valve supply port fluidly communicating with the first supply of the pneumatic fluid; and
a first check valve delivery port;
a first solenoid valve, including:
a first solenoid electronic control port electrically communicating with the valve electronic control port;
a first solenoid pneumatic supply port fluidly communicating with the valve pneumatic control port; and
a first solenoid pneumatic delivery port; and
a relay valve, including:
a relay valve pneumatic supply port fluidly communicating with the first supply of the pneumatic fluid based on a pressure of the first supply of the pneumatic fluid at the valve pneumatic supply port, the first check valve delivery port fluidly communicating with the relay valve pneumatic supply port, the first pneumatic check valve controlling the fluid communication of the first supply of the pneumatic fluid with the relay valve pneumatic supply port based on the pressure of the first supply of the pneumatic fluid at the valve pneumatic supply port;
a relay valve pneumatic delivery port fluidly communicating with the valve delivery port; and
a relay valve pneumatic control port fluidly communicating with the first solenoid pneumatic delivery port, a pressure of the pneumatic fluid at the relay valve delivery port based on a pressure of the pneumatic fluid at the relay valve control port;
wherein during a second failure:
the electronic control signal received at the electronic control port causes the first solenoid pneumatic delivery port to fluidly communicate with the first solenoid pneumatic supply port;
the pneumatic fluid at the valve pneumatic control port fluidly communicates with the relay valve pneumatic control port via the second solenoid pneumatic supply port and the second solenoid pneumatic delivery port; and
the pneumatic fluid at the valve pneumatic control port fluidly communicates with the relay valve pneumatic control port via a check valve.

6. The trailer control valve as set forth in claim 5, wherein:
the valve pneumatic supply port unrestrictedly fluidly communicates with the first supply of the pneumatic fluid independent of the driver brake demand.

7. The trailer control valve as set forth in claim 5:
further including a third solenoid valve, including:
a third solenoid electronic control port electrically communicating with the valve electronic control port;
a third solenoid pneumatic supply port fluidly communicating with both the second solenoid pneumatic delivery port and the relay valve pneumatic control port; and
a third solenoid pneumatic delivery port fluidly communicating with atmosphere pressure;
wherein during the first failure:
the electronic control signal received at the electronic control port causes the third solenoid pneumatic supply port to alternately fluidly communicate with the third solenoid pneumatic delivery port; and
the alternate fluid communication between the second solenoid valve pneumatic supply port and the second solenoid valve pneumatic delivery port in conjunction with the alternate fluid communication between the third solenoid pneumatic supply port to alternately fluidly communicate with the third solenoid pneumatic delivery port cooperates to achieve the driver brake demand.

8. The trailer control valve as set forth in claim 5, wherein:
during a first failure, the electronic control signal received at the electronic control port causes the first solenoid pneumatic delivery port to not fluidly communicate with the first solenoid pneumatic supply port.

* * * * *